(12) United States Patent
Kugel

(10) Patent No.: US 11,326,377 B2
(45) Date of Patent: May 10, 2022

(54) HOOD PROP

(71) Applicant: Joseph Kugel, Trubuco Canyon, CA (US)

(72) Inventor: Joseph Kugel, Trubuco Canyon, CA (US)

( * ) Notice: Subject to any disclaimer, the term of this patent is extended or adjusted under 35 U.S.C. 154(b) by 72 days.

(21) Appl. No.: 17/094,719

(22) Filed: Nov. 10, 2020

(65) Prior Publication Data
US 2021/0180383 A1   Jun. 17, 2021

Related U.S. Application Data

(60) Provisional application No. 62/947,456, filed on Dec. 12, 2019.

(51) Int. Cl.
*E05C 17/14* (2006.01)

(52) U.S. Cl.
CPC .................... *E05C 17/14* (2013.01)

(58) Field of Classification Search
CPC ........ E05C 17/14; E05C 17/045; E05C 17/12; E05C 17/18; E05C 17/50; B62D 25/105; B62D 25/12
USPC ................... 248/352; 294/193.11; 180/69.21
See application file for complete search history.

(56) References Cited

U.S. PATENT DOCUMENTS

| | | | | |
|---|---|---|---|---|
| 445,210 A * | 1/1891 | Walling | ................... | E05C 17/18 49/356 |
| 670,780 A * | 3/1901 | Hoopes | ................... | E05C 17/14 292/271 |
| 740,970 A * | 10/1903 | Zimmerman | ........... | E05C 17/14 292/271 |
| 782,721 A * | 2/1905 | Brown | .................... | E05C 17/14 292/271 |
| 839,693 A * | 12/1906 | Zimmerman | ........... | E05C 17/14 292/271 |
| 952,660 A * | 3/1910 | Zimmerman | ........... | E05C 17/14 292/271 |
| 956,256 A * | 4/1910 | Zimmerman | ........... | E05C 17/14 292/271 |
| 984,101 A * | 2/1911 | Millspaugh | ............. | E05C 17/14 105/308.1 |
| 1,052,227 A * | 2/1913 | Ebert | ...................... | E05C 17/14 292/271 |
| 1,158,657 A * | 11/1915 | Ebert | ...................... | E05C 17/14 292/271 |
| 1,158,658 A * | 11/1915 | Ebert | ...................... | E05C 17/22 292/262 |
| 1,216,968 A * | 2/1917 | Ebert | ...................... | E05C 17/14 292/271 |
| 1,218,366 A * | 3/1917 | Bried | ...................... | E05C 17/14 292/271 |

(Continued)

*Primary Examiner* — Jeffrey O'Brien
(74) *Attorney, Agent, or Firm* — Averill & Green; Kenneth L. Green

(57) ABSTRACT

A hood prop attaches to right and left side hoods and engages a receptacle plate attached to a fire wall. The hood prop includes a mounting plate attached to hood latch fasteners at a bottom rear position of each side hood. A mounting plate end of a prop arm is pivotally attached by a friction fit. The friction fit allows the arm to pivot on the rod but retain a position to reduce or eliminate any rattles. The arm includes at least one bend to align a firewall end of the prop arm with a receptacle reaching out from the receptacle plate.

10 Claims, 3 Drawing Sheets

(56) References Cited

U.S. PATENT DOCUMENTS

| | | | | |
|---|---|---|---|---|
| 1,348,260 A * | 8/1920 | Boyer | | E05C 17/14 |
| | | | | 292/262 |
| 1,392,606 A * | 10/1921 | Stoch | | E05C 17/14 |
| | | | | 292/266 |
| 2,806,728 A * | 9/1957 | Svensson | | E05C 17/14 |
| | | | | 292/271 |
| 3,225,857 A * | 12/1965 | De Haan | | B62D 25/12 |
| | | | | 180/69.21 |
| 4,172,611 A * | 10/1979 | Krus | | B60K 15/05 |
| | | | | 292/338 |
| 4,181,337 A * | 1/1980 | Muller | | E05C 17/14 |
| | | | | 16/404 |
| 5,273,326 A * | 12/1993 | Kinkaide | | E05C 17/04 |
| | | | | 292/DIG. 38 |
| 5,411,109 A * | 5/1995 | Orns | | B62D 25/12 |
| | | | | 180/69.2 |
| 5,651,164 A * | 7/1997 | DeMarco | | E05D 15/502 |
| | | | | 16/233 |
| 6,371,231 B1 * | 4/2002 | Nushii | | B62D 25/12 |
| | | | | 180/69.2 |
| 6,609,583 B2 * | 8/2003 | Schillaci | | B62D 25/12 |
| | | | | 180/69.21 |
| 6,695,391 B1 * | 2/2004 | Votruba | | B62D 63/064 |
| | | | | 296/100.06 |
| 6,904,643 B2 * | 6/2005 | Duffy | | E05C 17/30 |
| | | | | 16/83 |
| 6,942,256 B2 * | 9/2005 | Amy | | E05C 19/10 |
| | | | | 292/202 |
| 7,226,091 B2 * | 6/2007 | Amy | | E05C 17/14 |
| | | | | 292/262 |
| 7,434,855 B2 * | 10/2008 | Maeda | | E05C 17/04 |
| | | | | 292/262 |
| 7,987,939 B2 * | 8/2011 | Kisiler | | B62D 25/105 |
| | | | | 180/69.2 |
| 8,413,382 B2 * | 4/2013 | Uto | | E02F 9/00 |
| | | | | 49/381 |
| 8,480,141 B2 * | 7/2013 | Lee | | E05C 17/28 |
| | | | | 248/351 |
| 9,797,173 B2 * | 10/2017 | Claxton | | E05C 17/04 |
| 11,214,314 B2 * | 1/2022 | Smith | | E05C 17/04 |
| 2012/0056438 A1 * | 3/2012 | Enderle | | E05C 17/50 |
| | | | | 292/194 |
| 2018/0238089 A1 * | 8/2018 | Duvall | | E05C 17/12 |
| 2021/0131154 A1 * | 5/2021 | Cunningham | | B62D 25/12 |
| 2021/0180383 A1 * | 6/2021 | Kugel | | B62D 25/12 |

\* cited by examiner

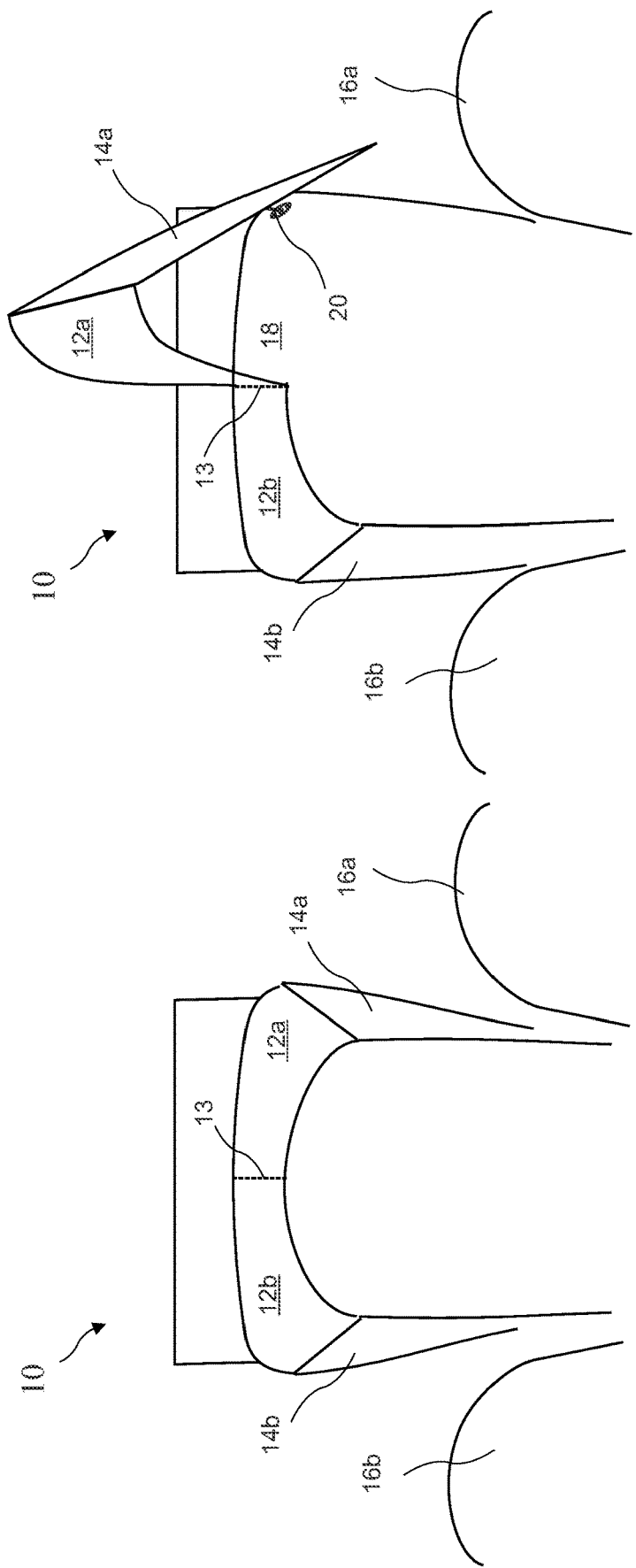

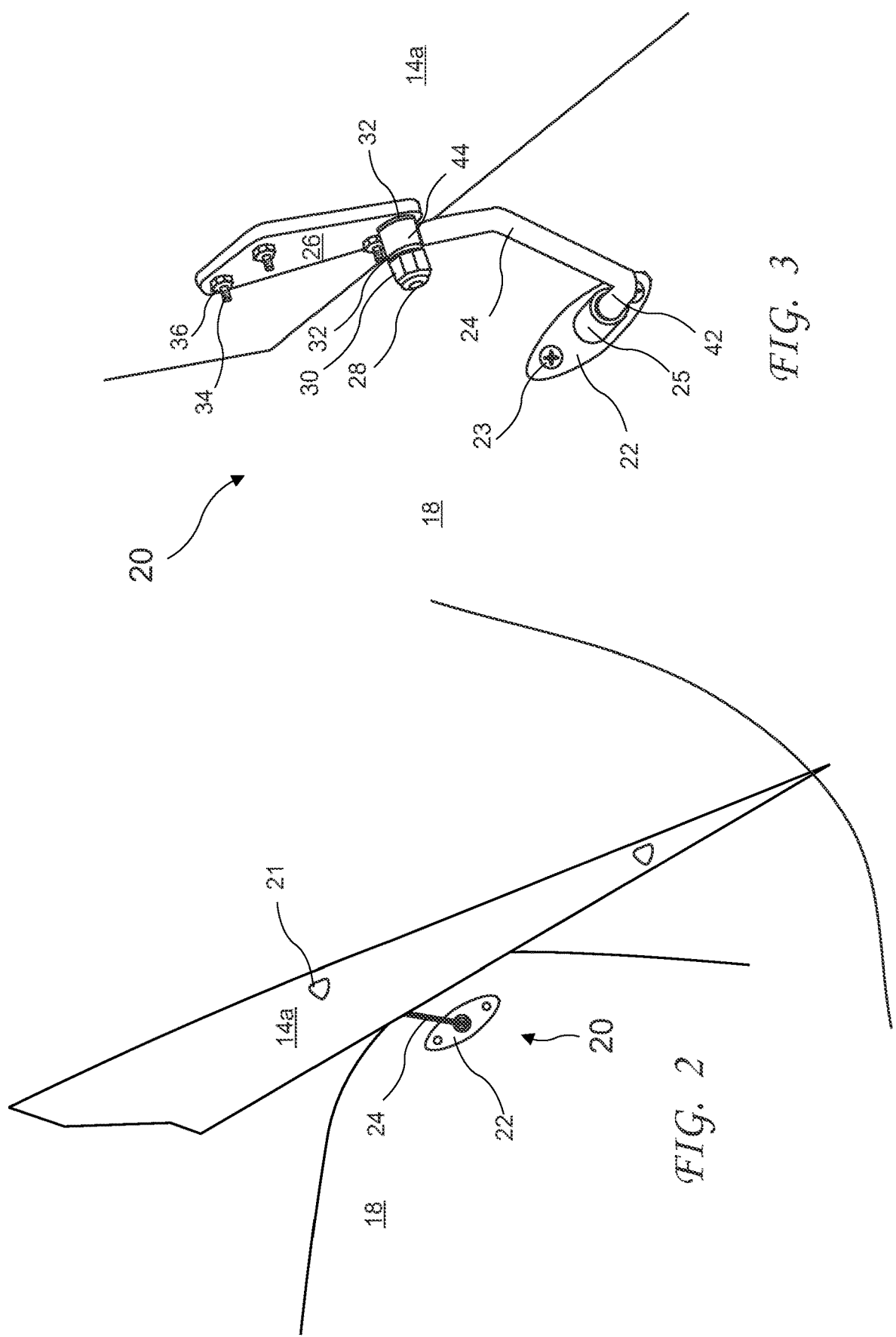

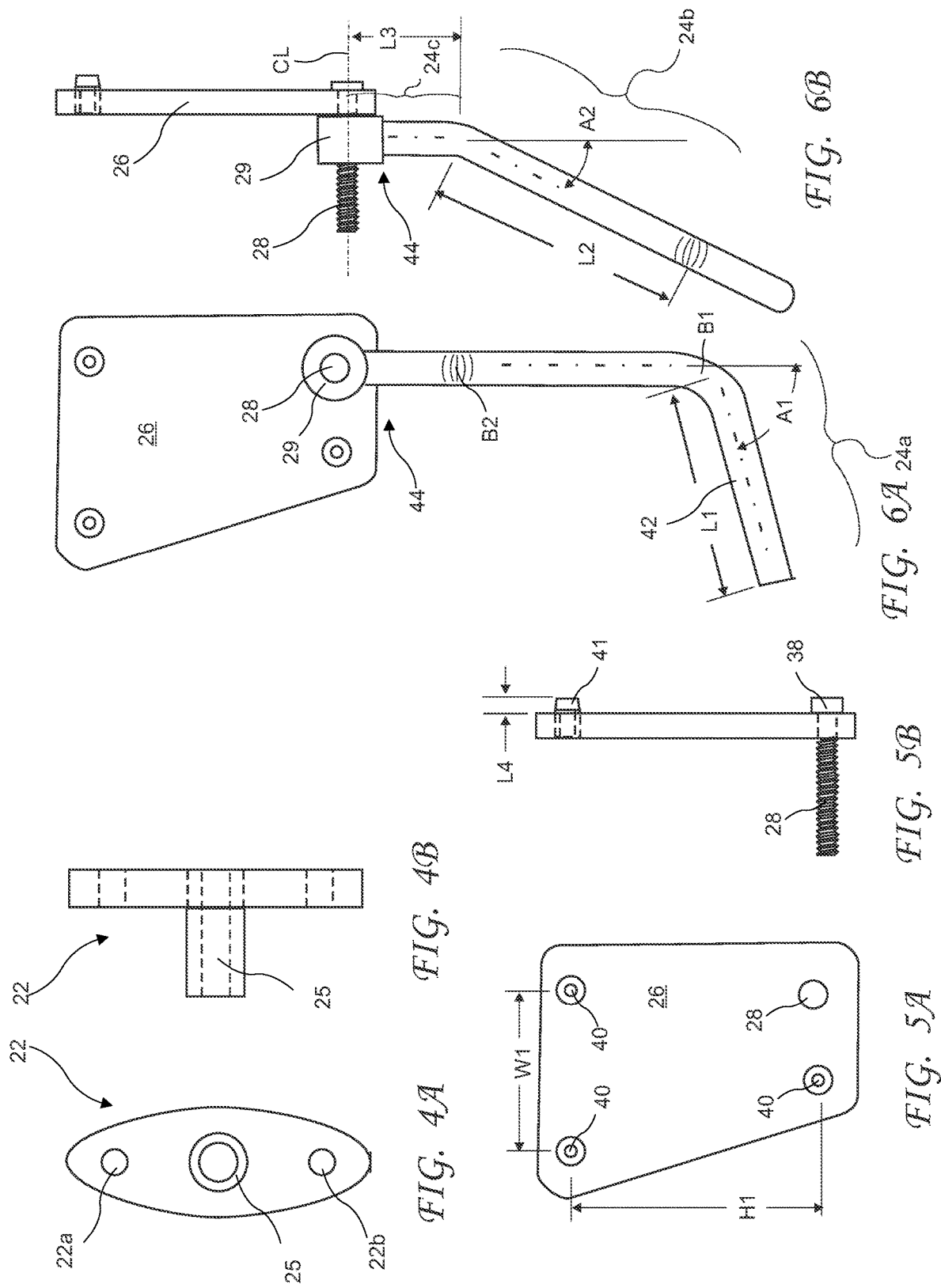

HOOD PROP

CROSS-REFERENCE TO RELATED APPLICATIONS

The present application claims the priority of U.S. Provisional Patent Application Ser. No. 62/947,456 filed Dec. 12, 2019, which application is incorporated in its entirety herein by reference.

BACKGROUND OF THE INVENTION

The present invention relates to hood props and in particular to a hood prop for a 1932 ford.

Hot rod construction is a major hobby in the United States. Replicas of 1932 Fords (also know as Deuce Coupes) are particularly popular. The 1932 Ford hood has a center section and two sides hingedly attached to the center. Each side has two latches along the bottom to latch the hood into place. The latches on either side may be released, and the side and center lifted for access to the engine and other under hood parts.

It is often desired to lock an opened side in a raise position for work on the engine and under hood parts, but known hood props are clumsy and unattractive. Because these cars are often entered in car shows with the hoods open, there is a need for an attractive and secure hood prop to retain the hood in an open position.

BRIEF SUMMARY OF THE INVENTION

The present invention addresses the above and other needs by providing a hood prop attached to right and left side hoods and engages a receptacle plate attached to a fire wall. The hood prop includes a mounting plate attached to hood latch fasteners at a bottom rear position of each side hood. A first end of a prop arm is pivotally attached by a friction (or interference) fit to a rod extending from the mounting plate. The friction fit allows the arm to pivot on the rod but retain a position by friction to reduce or eliminate any rattles. The arm includes at least one bend to align a second end of the prop arm with a receptacle reaching out from the receptacle plate.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A is a partial front view of a 1932 Ford automobile with a hood closed.

FIG. 1B is a partial front view of a 1932 Ford automobile with a driver's side hood open.

FIG. 2 shows a hood prop according to the present invention holding the driver's side hood open.

FIG. 3 shows a detailed view of the hood prop according to the present invention holding the driver's side hood open.

FIG. 4A shows a front view of a receptacle plate of the hood prop according to the present invention.

FIG. 4B shows a side view of the receptacle plate of the hood prop according to the present invention.

FIG. 5A shows a front view of a mounting plate of the hood prop according to the present invention.

FIG. 5B shows a side view of the mounting plate of the hood prop according to the present invention.

FIG. 6A shows a front view of a prop arm attached to the mounting plate of the hood prop according to the present invention.

FIG. 6B shows a side view of the prop arm attached to the mounting plate of the hood prop according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value. When generally is applied to terms such as perpendicular, the meaning is that the geometry appears perpendicular to the naked eye, but need not be precisely perpendicular, for example, within five degrees of perpendicular.

A partial front view of a 1932 Ford automobile with a hood closed is shown in FIG. 1A, and a partial front view of the 1932 Ford automobile with a driver's side hood top 12a and side hood 14a open is shown in FIG. 1B. The hood tops 12a and 12b are connected by a hinge 13 and each side may be opened separately. The drivers hood top 12a and the drivers side hood 14a are held open by a hood prop 20 according to the present invention.

The hood prop 20 is shown in FIG. 2 holding the driver's side hood 14a open by engaging a prop arm 24 with a receptacle plate 22 attached to a firewall 18. The hood prop 20 is preferably attached to the driver's side hood 14a by rear hood latch 21 fasteners 34.

A detailed view of the hood prop 20 holding the driver's side hood 14a open is shown in FIG. 3. The hood prop 20 includes the receptacle plate 22 attached to the fire wall 18 by fastener (preferably screws) 23, a firewall end 42 of the prop arm 24 removably engages a receptacle 25 fixed to the receptacle plate 22, and the mounting plate end 44 of the prop arm 24 pivots on a rod 28 attached to a mounting plate 26 attached to the driver's side hood 14a by the fasteners 34. The mounting plate 26 is shown attached to the driver's side hood 14a by three nuts 36 and fasteners 34 also attaching the rear hood latch (see FIG. 2) to the driver's side hood 14a. The receptacle 25 is preferably cylindrical.

A cylindrical collar 29 at the mounting plate end 44 resides over rod 28 held by nut 30. Preferably, the nut 30 is a lock nut and more preferably a nylon lock nut. Washers 32 reside at each end of the cylindrical collar 29. The nut 30 is tightened enough to provide a friction fit to hold the prop arm 24 in position, but to allow the prop arm 24 to be pivoted to insert the firewall end 42 into the receptacle 25.

A front view of the receptacle plate 22 is shown in FIG. 4A and a side view of the receptacle plate 22 is shown in FIG. 4B. The receptacle plate 22 is preferably oval or elliptical in shape, but may be any shape. The receptacle 25 extends generally perpendicularly from the receptacle plate 22.

A front view of the mounting plate 26 of the hood prop 20 is shown in FIG. 5A and a side view of the mounting plate 26 of the hood prop 20 is shown in FIG. 5B. The mounting plate 26 includes three fastener passages 40 preferably aligned with hood latch fasteners 34. The top mounting plate passages 40 are spaced 1¼ inches apart, and the bottom mounting plate passage 40 is 2⅛ inches below the top passages 40.

In one embodiment, the rod 28 is part of a bolt attached to the mounting plate 26. A bolt head 38 is on a back side of the mounting plate 26 and three stand-offs 41 aligned with the mounting plate passages 40 for the hood latch fasteners 34. The three stand-offs 41 space the mounting plate 26 from the drivers side hood 14a providing space for the bolt head 38. The standoffs are preferably ⁵⁄₁₆ inch outside diameter and space the mounting plate 26 ⅛ inches away from the drivers side hood 14a.

A front view of the prop arm 24 attached to the mounting plate 26 of the hood prop 20 is shown in FIG. 6A and a side view of the prop arm 24 attached to the mounting plate 26 of the hood prop 20 is shown in FIG. 6B. The prop arm 24 is preferably between three and six inches long to reach from the mounting plate 26 to the receptacle 25, and has a fire wall end 42 with a straight segment at least ½ inch long for inserting into the receptacle 25, and is bent to between 70 and 90 degrees to align with the receptacle 25.

In one embodiment a prop arm 24 has three sections, a first section 24a engaging the firewall 18, a third section 24c engaging the side hood 14a, and a second section 24b connecting the first and third sections. The first section 24a has a length L1 of about 1.6 inches. The second section 24b has a length L2 of about 2 inches, and the third section 24a has a length L3 of about 1.25 inches.

A first bend B1 in the prop arm 24, between the first and second sections 24a and 24b, is an angle A1 of about 75 degrees. The first bend B1 bends the prop arm 24 into the plane of the mounting plate 26 to allow aligning with the receptacle 25.

A second bend B2, in the prop arm 24 is between the second and third sections 24b and 24c, is an angle A2 of about 25 degrees. The second bend B2 bends the prop arm 24 in a direction away from the side hood 14b.

While the invention herein disclosed has been described by means of specific embodiments and applications thereof, numerous modifications and variations could be made thereto by those skilled in the art without departing from the scope of the invention set forth in the claims.

I claim:

1. An automobile hood prop, comprising:
   a receptacle plate attached to an automobile fire wall;
   a receptacle reaching out from the receptacle plate;
   a mounting plate attached to a side hood;
   a prop arm having a hood end pivotally attached to the mounting plate; and
   a firewall end of the prop arm insertable into the receptacle to retain the side hood in an open position;
   wherein the mounting plate is attached to the side hood by mounting plate fasteners aligned with locations of original hood latch fasteners in the side hood; and
   wherein the mounting plate fasteners attach both the mounting plate and hood latches to the side hood.

2. The hood prop of claim 1, wherein the mounting plate fasteners reach through mounting plate passages in the mounting plate.

3. The hood prop of claim 1, wherein: the mounting plate includes standoffs aligned with three of the mounting plate passages on a surface of the mounting plate facing the side hood; a rod reaches through a fourth mounting plate passage and away from the side hood, and the hood end of the prop arm resides on the rod.

4. The hood prop of claim 3, wherein the prop arm is pivotally attached to the mounting plate by a friction fit.

5. The hood prop of claim 4, wherein: the prop arm has a cylindrical collar residing on the rod; and the rod is threaded and a lock nut is tightened against the cylindrical collar to provide the friction fit between the prop arm to the rod.

6. The hood prop of claim 3, wherein: the rod is a bolt; the fourth mounting plate passage is a threaded passage; the bolt is tightened into the threaded passage leaving a bolt head between the mounting plate and the hood side; and the standoffs provide space for the bolt head to reside between the mounting plate and the hood side.

7. The hood prop of claim 1, wherein: the prop arm is between three and six inches long; the prop arm fire wall end has a straight segment at least ½ inch long for inserting into the receptacle; and the prop arm is bent to between 70 and 90 degrees to align the fire wall end with the receptacle.

8. The hood prop of claim 1, wherein the prop arm comprises: a first section having a length of about 1.6 inches and engaging the receptacle; a third section having a length of about 1.25 inches and engaging the mounting plate at the hood end; a second section having a length of about two inches and connecting the first and third sections; a first bend of about 75 degrees between the first and second sections, the first bend bends the prop arm into a plane of the mounting plate to allow aligning the first section with the receptacle; and a second bend in the prop arm between the second and third sections of about 25 degrees in a direction away from the side hood.

9. An automobile hood prop, comprising: a receptacle plate attached to an automobile fire wall; a receptacle reaching out from the receptacle plate perpendicular to the receptacle plate; a mounting plate attached to a side hood; a prop arm having a hood end pivotally attached to the mounting plate; a firewall end of the prop arm insertable into the receptacle to retain the side hood in an open position; the mounting plate is attached to the side hood by mounting plate fasteners aligned with locations of original hood latch fasteners in the side hood, the mounting plate fasteners reach through mounting plate passages in the mounting plate and the mounting plate fasteners attach both the mounting plate and hood latches to the side hood; standoffs aligned with three of the mounting plate passages on a surface of the mounting plate facing the side hood; a threaded bolt reaches through a threaded fourth mounting plate passage and away from the side hood, and a cylindrical collar at the hood end of the prop arm residing on the bolt; a lock nut is tightened against the cylindrical collar to provide a friction fit between the prop arm and the mounting plate; the bolt is tightened into the threaded passage leaving a bolt head between the mounting plate and the hood side; the standoffs provide space for the bolt head to reside between the mounting plate and the hood side; the prop arm comprises: a first section having a length of about 1.6 inches and engaging the receptacle; a third section having a length of about 1.25 inches and engaging the mounting plate at the hood end; a second section having a length of about two inches and connecting the first and third sections; a first bend of about 75 degrees between the first and second sections, the first bend bends the prop arm into a plane of the mounting plate to allow aligning the first section with the receptacle; and a second bend in the prop arm between the second and third sections of about 25 degrees in a direction away from the side hood.

10. An automobile hood prop, comprising: a receptacle plate attached to an automobile fire wall; a receptacle reaching out from the receptacle plate perpendicular to the receptacle plate; a mounting plate attached to a side hood; a prop arm having a hood end pivotally attached to the mounting plate; a firewall end of the prop arm insertable into the receptacle to retain the side hood in an open position; the mounting plate is attached to the side hood by mounting plate fasteners aligned with locations of original hood latch fasteners in the side hood, the mounting plate fasteners reach through mounting plate passages in the mounting plate and the mounting plate fasteners attach both the mounting plate and hood latches to the side hood; standoffs aligned with three of the mounting plate passages on a surface of the mounting plate facing the side hood; a threaded bolt reaches through a threaded fourth mounting plate passage and away from the side hood, and a cylindrical collar at the hood end of the prop arm residing on the bolt; a lock nut is tightened against the cylindrical collar to provide a friction fit between the prop arm and the mounting plate; the bolt is tightened into the threaded passage leaving a bolt head between the mounting plate and the hood side; the standoffs provide space for the bolt head to reside between the mounting plate and the hood side; the prop arm is between three and six inches long; the prop arm fire wall end has a straight segment at least ½ inch long for inserting into the receptacle; and the prop arm is bent to between 70 and 90 degrees to align the fire wall end with the receptacle.

\* \* \* \* \*